(12) United States Patent
Musial et al.

(10) Patent No.: US 9,795,883 B2
(45) Date of Patent: Oct. 24, 2017

(54) OPERATIONAL MANAGEMENT OF MULTI-MEDIA GAMING DEVICES

(75) Inventors: John G. Musial, Newburgh, NY (US);
Abhinay R. Nagpal, Maharashtra (IN);
Sandeep R. Patil, Elmsford, NY (US);
Sri Ramanathan, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1592 days.

(21) Appl. No.: 12/786,900

(22) Filed: May 25, 2010

(65) Prior Publication Data
US 2011/0295666 A1    Dec. 1, 2011

(51) Int. Cl.
| A63F 13/77 | (2014.01) |
| A63F 13/42 | (2014.01) |
| G06Q 30/02 | (2012.01) |
| G06Q 10/10 | (2012.01) |
| A63B 24/00 | (2006.01) |

(52) U.S. Cl.
CPC .............. *A63F 13/77* (2014.09); *A63F 13/42* (2014.09); *G06Q 10/10* (2013.01); *G06Q 30/0209* (2013.01); *G06Q 30/0224* (2013.01); *A63B 24/0062* (2013.01); *A63B 2024/0065* (2013.01); *A63B 2024/0068* (2013.01); *A63F 2300/1012* (2013.01); *A63F 2300/558* (2013.01); *A63F 2300/5566* (2013.01); *A63F 2300/61* (2013.01)

(58) Field of Classification Search
CPC .......... A63F 13/00; A63F 13/10; A63F 13/12; A63F 2300/1012; A63F 2300/558; A63F 2300/61; A63F 2300/5566; A63F 2300/69; A63F 13/77; A63F 13/42; G06Q 30/0224; G06Q 30/0209; G06Q 10/10; A63B 24/0084; A63B 2220/803; A63B 2220/836; A63B 2225/15; A63B 2225/20; A63B 2230/00; A63B 2230/04–2230/505; A63B 2024/0065; A63B 2024/0068; A63B 24/0062
See application file for complete search history.

(56) References Cited

U.S. PATENT DOCUMENTS

| 6,595,850 B2 | 7/2003 | Yamaki |
| 7,272,426 B2 | 9/2007 | Schmid |
| 2006/0089543 A1 | 4/2006 | Kim et al. |
| 2006/0287106 A1 | 12/2006 | Jensen |
| 2007/0066403 A1 | 3/2007 | Conkwright |
| 2007/0207858 A1 * | 9/2007 | Breving .......................... 463/36 |

(Continued)

OTHER PUBLICATIONS

Wii Fit Plus, 2009, Nintendo.*

*Primary Examiner* — Werner Garner
(74) *Attorney, Agent, or Firm* — Cantor Colburn LLP (57) ABSTRACT

Operational management of a multi-media system includes assessing end user performance with respect to operation of a multi-media device in the multi-media system. Upon determining a performance value derived from assessment of the end user performance exceeds a pre-defined threshold value, the operational management further includes identifying accommodation options that specify modifications to the operation of the multi-media device and/or operations of another multi-media device in the multi-media system that is engaged in a media activity concurrent with the end user of the multi-media device.

20 Claims, 5 Drawing Sheets

(56) References Cited

U.S. PATENT DOCUMENTS

| | | |
|---|---|---|
| 2008/0098448 A1 | 4/2008 | Mondesir et al. |
| 2008/0235121 A1* | 9/2008 | Gonen .......................... 705/35 |
| 2008/0300914 A1* | 12/2008 | Karkanias et al. ............... 705/2 |
| 2008/0318678 A1 | 12/2008 | Stivorik et al. |
| 2009/0069075 A1 | 3/2009 | Silvestro |
| 2009/0222742 A1 | 9/2009 | Pelton et al. |
| 2009/0309891 A1 | 12/2009 | Karkanias et al. |
| 2009/0319608 A1 | 12/2009 | Anil et al. |

\* cited by examiner

OPERATIONAL MANAGEMENT OF MULTI-MEDIA GAMING DEVICES

BACKGROUND

The present invention relates to multi-media devices and applications, and more specifically, to operational management of multi-media gaming devices.

Due to advancements in technology and the ubiquitous nature of the Internet, network-based video games and computer simulations are becoming a revolutionary medium for entertainment and education. Multi-player gaming as well as multi-player team games have become very popular, for example Half-Life™ and Counter-Strike™ (developed by Valve Software®) and Combat™ (developed by Atari®). In fact, there are world championship competitions held for multi-player and multi-player team gaming.

With the increased competitive interest in multi-player and multi-team gaming, more and more focus is being directed to player/team strategy. As with most team-based activities, some individuals exhibit more advanced skills than others. Additionally, even those individuals who exhibit advanced skills may not be able to fully sustain their skills, for example, while under stress or over a period of time due to fatigue, injury, illness, or other factors. Thus, any developed team strategy may benefit from dynamic, real-time adjustments in order to accommodate various unforeseen situations and maximize the overall success of game play.

SUMMARY

According to one embodiment of the present invention, operational management of a multi-media system is provided. The operational management includes assessing end user performance with respect to operation of a multi-media device in the multi-media system. Upon determining a performance value derived from assessment of the end user performance exceeds a pre-defined threshold value, the operational management further includes identifying accommodation options that specify modifications to the operation of the multi-media device and/or operations of another multi-media device in the multi-media system that is engaged in a media activity concurrent with the end user of the multi-media device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide for operational management of a multi-media gaming system. In an exemplary embodiment, the operational management of a gaming system enables the dynamic, real-time adjustment of a game strategy in order to accommodate various situations (e.g., impaired capabilities of an end user due to fatigue, injury, illness, environmental distractions, or other factors) and maximize success in the game play. The exemplary operational management of a gaming system utilizes various sensor data in conjunction with historical sensor data and historical performance data to calculate one or more performance values that reflect end user capabilities, and uses these performance values to dynamically identify suitable accommodations that may be implemented to the existing game strategy. In addition, the exemplary embodiments of the invention include a reward structure that may be used in enticing team members to accept new tasks as part of identified accommodations based upon one or more team member's performance values.

Figure 1:
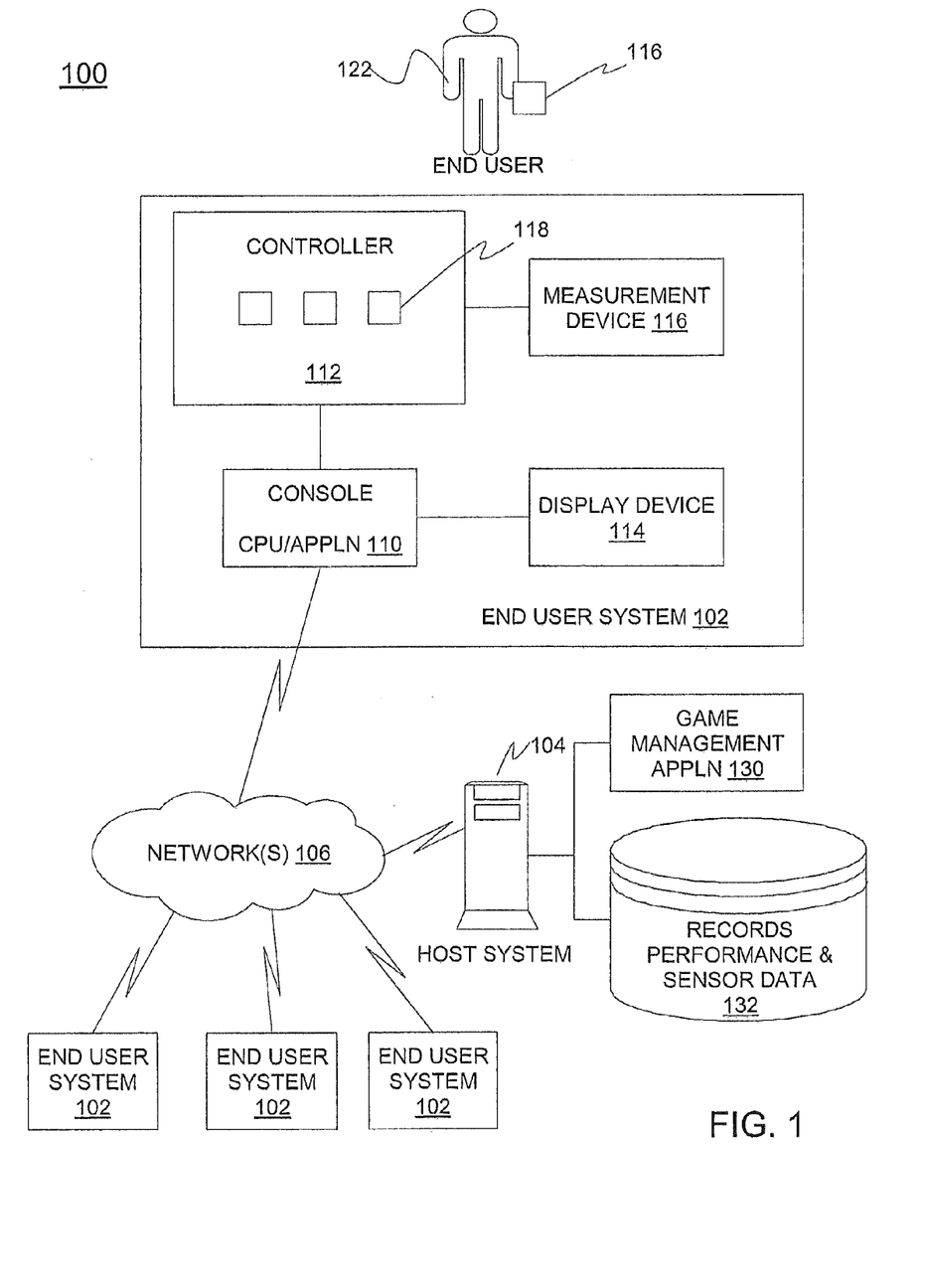
FIG. 1 depicts a block diagram of a system upon which operational management of multi-media gaming devices may be implemented in an exemplary embodiment.

With reference now to FIG. 1, an exemplary system 100 upon which operational management of one or more multi-media gaming devices may be implemented will now be described. In an exemplary embodiment, the system 100 of FIG. 1 includes an end user system 102. In an exemplary embodiment, the end user system 102 is implemented as a multi-media gaming device (also referred to herein as "multi-media device"). The exemplary end user system 102 of FIG. 1 includes an input component (illustrated in FIG. 1 as a hand held controller), a console 110, and output component 114 (illustrated in FIG. 1 as a display device). The controller 112 includes control keys 118 for inputting various commands by an end user 122 (also referred to herein as "user" or "player") to the console 110. However, it will be understood that other implementations of the input component 112 may be utilized, e.g., a keyboard, keypad, simulated sports equipment used in applications directed to health and fitness (e.g., tennis racquet, bowling ball, baseball bat, etc.), and floor pad (e.g., for use in dance, aerobics, etc.), to name a few.

The display device 114 may be a computer monitor or other visual display screen. Responses to inputs to the controller 112, as well as related application data, are output to the display device 114. The controller 112 and display device 114 may be communicatively coupled to the console 110 via wireless or wireline methods. It will be understood that the controller 112, console 110 and display device 114 may be physically incorporated into a single device, e.g., as a laptop, personal digital assistant, cellular telephone, etc.

While shown in FIG. 1 as being substantially rectangular, it will be understood that the controller 112 may be configured to have varying dimensions. Additionally, the console 110 may be adapted to be used with multiple different controllers 112 (e.g., a controller 112 may be configured for use with a particular gaming application implemented by the console 110) and may include multiple communication ports (not shown) for communicating with multiple controllers 112 at one time (e.g., for use with a multi-player application executing on the console 110). The controller 112 may be ergonomically designed for optimal hand held use based upon the various functions assigned to its control keys 118. In other words, control keys 118 that are most frequently accessed may be placed at a location of the controller 112 that is most easily accessible to an end user 122. The controller 112 may be designed with handles at either end of the controller 112 for two-handed operation.

The console 110 includes one or more computer processing units (CPUs), which in turn, execute an operating system (O/S) and one or more applications. The console 110 may also include internal memory (not shown). The applications may include gaming applications, web-based applications (e.g., browser software), and communications applications (e.g., texting software, email, instant messaging, etc.), to name a few. In an exemplary embodiment, the applications also include a game management application for implementing the exemplary operational management of multi-media devices. The end user device 102 may include a network adapter (not shown) for communicating over one or more networks 106.

In an exemplary embodiment, a measurement device 116 is communicatively coupled to the end user device 102 (e.g., via controller 112). The measurement device 116 gathers data during operation of a gaming application on the console 110 (i.e., via contact with the end user 122) and communicates the data to the game management application executing on the console 110. In an exemplary embodiment, the measurement device 116 is configured as a non-invasive device to ensure optimal comfort for the end user 122 during game play. The measurement device 116 measures data relating to the physical condition of the end user 122. In one exemplary embodiment, the measurement device 116 measures biometric data, such as one or more of pulse, body temperature, pH levels, etc., via corresponding components, such as a pulse rate monitor, temperature gauge, and pH sensor. The measurement device 116 may alternatively, or in addition thereto, measure non-biometric data, such as motion, key pressure sensitivity of control keys 118, etc. Individually, and collectively, these measurements may indicate physical conditions, such as stress, anxiety, injury, weakness, fatigue, distraction, and illness. For example, stress and anxiety can be measured by increased pulse, sweat levels, and accelerated motion. Injury, weakness, illness, and fatigue can be measured by key pressure sensitivity and increased body temperature. In addition, distractibility and diminished reaction time can be measured by a decrease in detected motion.

In one exemplary embodiment, a measurement device 116 may be coupled to the end user 122, as shown in FIG. 1. If coupled to the end user 122, the measurement device 116 may include other components, e.g., a blood pressure monitor. The measurement device 116 located on the end user 122 may be communicatively coupled to the end user system 102, e.g., wirelessly using communication technologies such as Bluetooth™, or may be physically connected with the end user device 102. The measurement device 116 sends measurement data gathered from the end user 122 to the end user system 102.

In an exemplary embodiment, the operational management of multi-media gaming system processes monitor the performance of the end user 122 via sensor data received from the sensor device 116, analyzes the sensor data to derive one or more performance values that reflect the overall performance (i.e., capabilities) of the end user 122, and identifies possible accommodations that may be made by the end user 122 to increase physical comfort and maximize success in the game play strategy. In one exemplary embodiment, the operational management of multi-media gaming system processes store this sensor data (e.g., in the memory of the console 110) and apply stored sensor data (e.g., historical sensor data from previous game play) to sensor data gathered during future game play in order to identify any deviations in performance/capabilities and perform trend analysis. This trend analysis may be used to calculate end user performance levels over time. For example, sensor data stored for a highly skilled end user 122 may reflect maximum performance levels and physical condition. However, due to various factors such as injury, illness, distraction, etc., the current performance value may reflect a performance level that is deficient as compared to previously determined performance levels. This new and current sensor data suggests that the end user 122 may be temporarily impaired. The operational management of multi-media gaming system processes may suggest accommodations based upon the current sensor data.

In an exemplary embodiment, the accommodations relate to modifications of tasks (or re-allocation of tasks in a multi-player environment) and may be determined by the operational management of multi-media gaming system processes using various techniques. For example, functions are assigned to particular control keys 118, such as "fire," "jump," "fly." Suppose, the function "fire" is assigned to a particular control key 118, and the sensor data (e.g., key pressure sensitivity of the control key 118) indicates fatigue or weakness (i.e., end user pressure applied to control key is diminished). The operational management of multi-media gaming system processes may determine that the end user 122 may not perform well under attack during pendency of the currently executing gaming application, since operation of the particular "fire" control key 118 is impaired according to the sensor data. The operational management of multi-media gaming system processes may suggest alternative behavior or tasks for the end user 122, e.g., changing from an offensive strategy to a defensive strategy that involves one or more control keys in which the end user has demonstrated acceptable capabilities. In another example, suppose the function "fire" is assigned to a particular control key 118, and the sensor data (e.g., rapid pulse, increased pH levels) indicates stress or anxiety. The operational management of multi-media gaming system processes may determine that the end user 122 may not perform well under attack during pendency of the currently executing gaming application, and may suggest alternative behavior or tasks for the end user (e.g., retreat or defense), which alternative tasks are likely to reduce stress and anxiety.

In an exemplary embodiment, the operational management of multi-media gaming system processes may also identify accommodations based on a position or location of the end user (e.g., avatar) in the gaming application. By tracking the flow of the gaming application during runtime, the operational management of multi-media gaming system processes track current positions and related operations corresponding to the positions, and use this information to assess possible tasks for accommodation.

In another exemplary embodiment, in addition to storing historical sensor data from previous game play, the operational management of a gaming system may also store past performance data (e.g., relative success/failure of specific tasks, operations, or levels of game play) associated with the end user 122 in memory of the console 110. This type of information may be useful in understanding the end user's overall skill level (e.g., beginner, advanced, expert) and may be used in conjunction with the past and current sensor data in calculating performance values for the end user 122. The historical sensor data and historical performance data may be stored using data records, as shown and described in FIG. 2.

As described above, the operational management of multimedia gaming system processes may be implemented for an end user 122 as a single player in a gaming application. It will be understood, however, that the operational management of multi-media gaming system processes may be used in a multi-player environment, e.g., where more than one player is engaged in a gaming application on the end user system 102 (e.g., using multiple controllers 112). In this exemplary embodiment, the operational management of multi-media gaming system processes may analyze the performance of each end user 122 relative to one another in identifying any accommodations. This multi-player performance analysis is described further herein.

In another exemplary embodiment, the end user 122 may collaborate with, or compete with, other end users with respect to a gaming application over the network(s) 106. In a multi-player environment, each end user 122 may be competing with other end users as individuals. Alternatively, each end user 122 may be part of a multi-player team that competes with other teams, as will now be described.

As shown in FIG. 1, in an exemplary embodiment, a host system 104 is in communication with end user systems 102 over the network(s) 106. The host system 104 may implement the operational management of gaming system processes for multiple end user systems 102 via a game management application 130. The game management application 130 may be implemented as an application programming interface to an existing gaming application or may be incorporated as part of the gaming application itself. The game management application 130 may perform the same or similar functions as those described above with respect to the game management application executing on the console 110. The host system 104 may be a high-speed computer processing device such as a mainframe computer, which is implemented, e.g., by an application service provider or a gaming enterprise. In an exemplary embodiment, the host system 104 is communicatively coupled to a storage device 132, which stores records, performance data, and related information used in implementing the operational management of multi-media gaming system processes, as described herein.

In an exemplary embodiment, the host system 104 performs the operational management of multi-media gaming system processes in a multi-player and/or multi-team environment in a similar manner as described above with respect to the single player embodiment. The operational management of multi-media gaming system processes monitor the performance (capabilities) of end users via sensor data received from the sensor devices 116, analyze the sensor data to derive performance values that reflect the overall performance and capabilities of each of the end users, and identifies possible accommodations that may be provided to one or more end users to increase physical comfort and maximize success in the game play strategy. In an exemplary embodiment, the game management application 130 includes data records configured to track, monitor, and analyze performance data and sensor data for each player in a multi-player and/or multi-team gaming environment, as described in FIG. 2.

Figure 2:
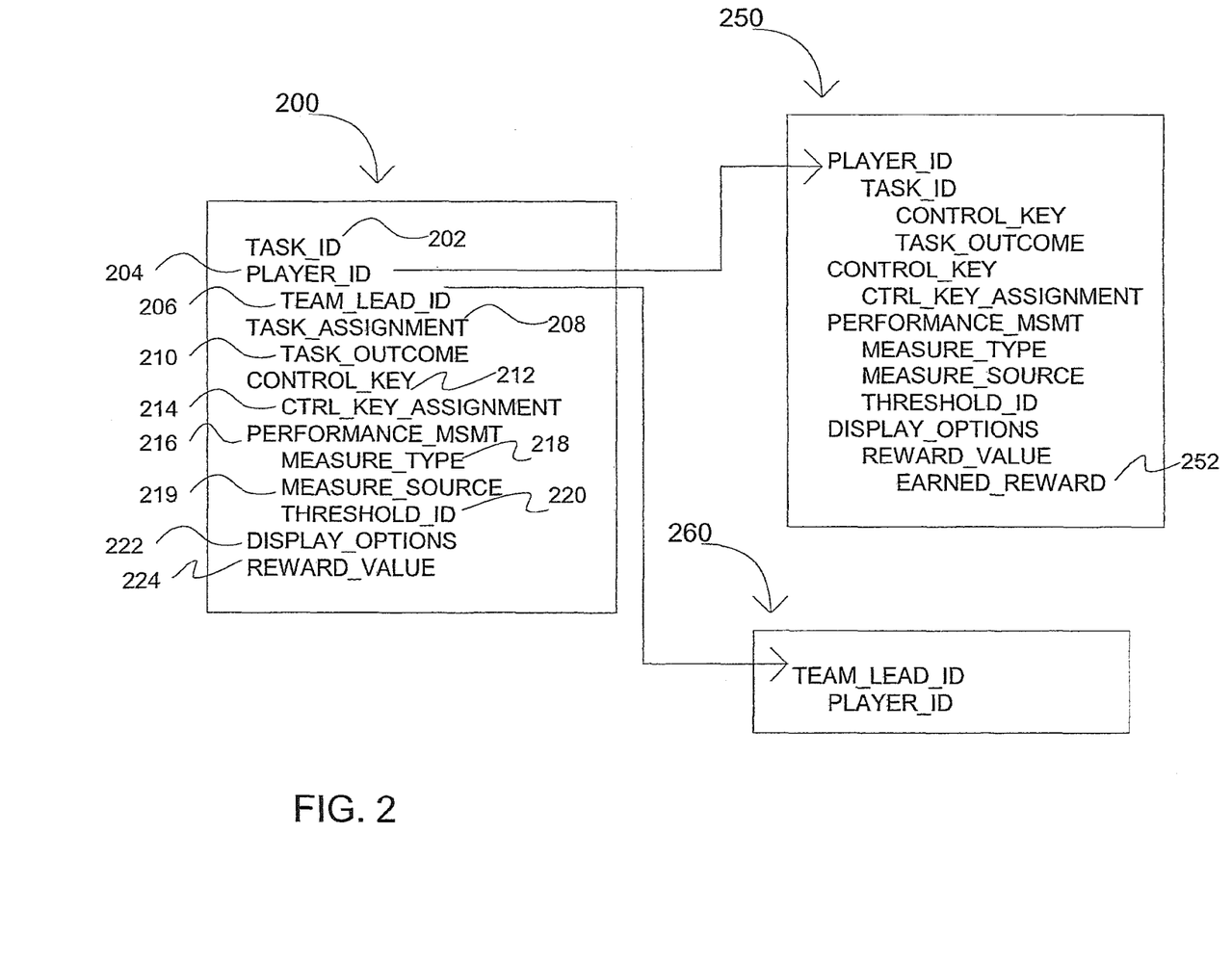
FIG. 2 illustrates data records used in implementing the operational management of multi-media gaming devices in an exemplary embodiment.

Turning now to FIG. 2, various data records utilized by the game management application 130 will now be described in an exemplary embodiment. As shown in FIG. 2, data records 200, 250, and 260 are linked via a key or reference pointer. The operational management of multi-media gaming system processes utilize the data records 200, 250, and 260 to monitor, track, and analyze performance data. As shown in FIG. 2, record 200 manages data for multiple players (and/or multiple player teams) with respect to a gaming application and/or multiple players and teams in a gaming application. As shown in data record 200, a TASK_ID field 202 identifies each of the tasks associated with a particular gaming application. A PLAYER_ID field 204 identifies each of the players (end users) collaborating (or competing) in a multi-player gaming application. In one exemplary embodiment where multiple players are involved, a team leader may be assigned to perform overall management and control of various application elements and player tasks. A TEAM_LEAD_ID field 206 may be used to identify the team leader for each of the respective teams.

A TASK_ASSIGNMENT field 208 specifies to which players each of the particular tasks is assigned. This assignment may be a function of the particular rules of a respective gaming application. A TASK_OUTCOME field 210 indicates the outcomes (e.g., success/failure or score value) of the tasks associated with the TASK_ASSIGNMENT field 208. In an exemplary embodiment, the TASK_OUTCOME field 210 may be used to track and store historical performance data (e.g., success/failure or scores associated with various tasks).

A CONTROL_KEY field 212 identifies each of the control keys 118 on the controller 110. A CTRL_KEY_ASSIGNMENT field 214 maps a particular function that is implemented by the control key associated with the CONTROL_KEY field 212. For example, a function of a control key may be to "jump," "accelerate," "fly," or fire a weapon. In an exemplary embodiment, the game management application 130 maps sensor data to these functions to determine physical conditions of the end user via the CTRL_KEY_ASSIGNMENT field 214 and other related fields in the record 200.

A PERFORMANCE_MSMT field 216 specifies performance values attributed to players associated with the PLAYER_ID field 204. The performance values are derived from the sensor data in conjunction with the historical sensor data (e.g., via a MEASURE_TYPE field 218 and MEASURE_SOURCE field 219) and historical performance data (e.g., via TASK_ASSIGNMENT field 208 and TASK_OUTCOME field 210). The MEASURE_TYPE field 218 specifies the type of data subject to measurement by the measurement device 116 (e.g., pulse rate, blood pressure, pH level, etc.). Likewise, the MEASURE_SOURCE field 219 indicates the type of measurement component that is gathering the measurement data associated with MEASURE_TYPE field 218. A THRESHOLD_ID field 220 indicates some value by which the performance value associated with PERFORMANCE_MSMT field 216 is measured. The threshold value may be used to trigger an assessment for determining an accommodation. For example, a threshold value may be a combination of measurement data that is normalized (or weighted) and which value is believed to be indicative of an impairment or deficiency of an end user. The threshold value may be a programmable field or may be static in nature.

Any type of threshold value may be used in implementing the exemplary processes described herein. For example, a percentage increase in blood pressure; a pulse that exceeds a pre-established rate or a pulse that exceeds a certain percentage above the individual "player's" historical norm; a performance threshold value may be a number of consecutive misses on a firing target; a percentage of misses as compared to a historical norm (team or player norm), etc. As for injury or fatigue determinations, a threshold value may be a percentage of diminished pressure applied to one or more control keys 118 of the controller 112 over a period of time. These types of threshold values are provided as non-limiting examples. It will be understood that various other types of threshold values may be employed.

Figure 4:
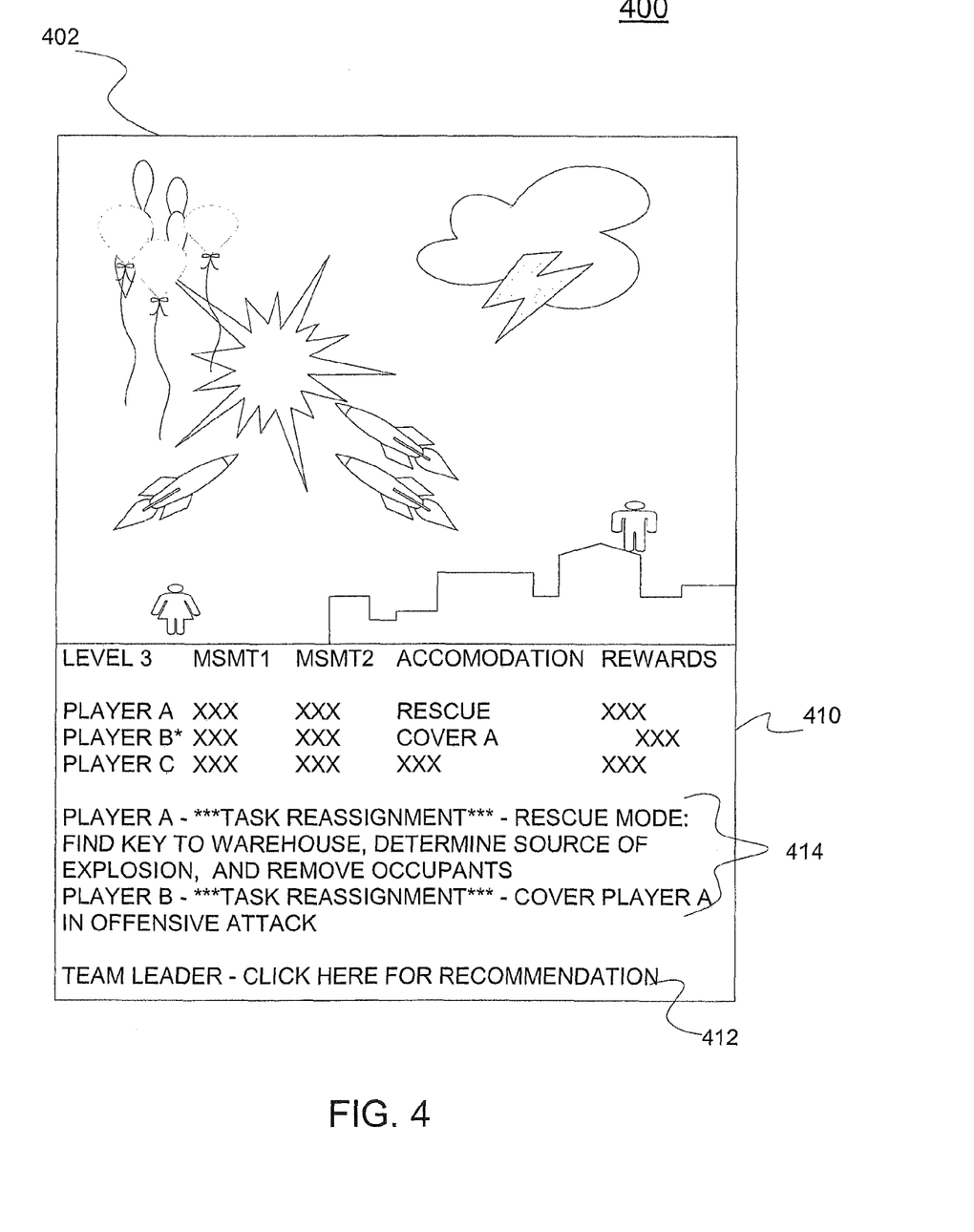
FIG. 4 illustrates a user interface screen of a multi-media gaming device in an exemplary embodiment.

A DISPLAY_OPTIONS field 222 enables one or more end users of an application to display performance data (e.g., data gathered in fields 202-210, 216, 218, 219, 220, and 224) on the display device 114 of the end user system 102. A sample of the data that may be displayed by this option is shown in FIG. 4.

A REWARD_VALUE field 224 specifies the nature of rewards that may be offered to end users based upon their acceptance of certain tasks, as will be described further herein. The nature and amount of reward may be a programmable or static value.

In an exemplary embodiment, the record 200 is linked by a pointer (i.e., PLAYER_ID field 204) to a record 250. The record 250 contains many of the same types of fields as described above with respect to record 200. However, the record 250 is configured specifically to track and monitor individual player performance via the PLAYER_ID field 204. In addition, the record 250 may be utilized in lieu of the record 200 for single player gaming. In an exemplary embodiment, the record 250 includes an EARNED_REWARD field 252 that identifies any reward associated with REWARD_VALUE field 224 that has been earned by the particular player identified for the record 250.

Additionally, in an exemplary embodiment, the record 200 is linked by a second pointer (i.e., TEAM_LEAD_ID field 206) to record 260. Record 260 may be employed to track team leaders in a multi-player team environment, such as the team leaders' decisions with respect to identified accommodations or task re-assignments, as will be described further herein.

The data records shown in FIG. 2 are for illustrative purposes only. It will be understood that other data structures, elements, and fields may be used in tracking, monitoring, and evaluating end user capabilities.

Figure 3:
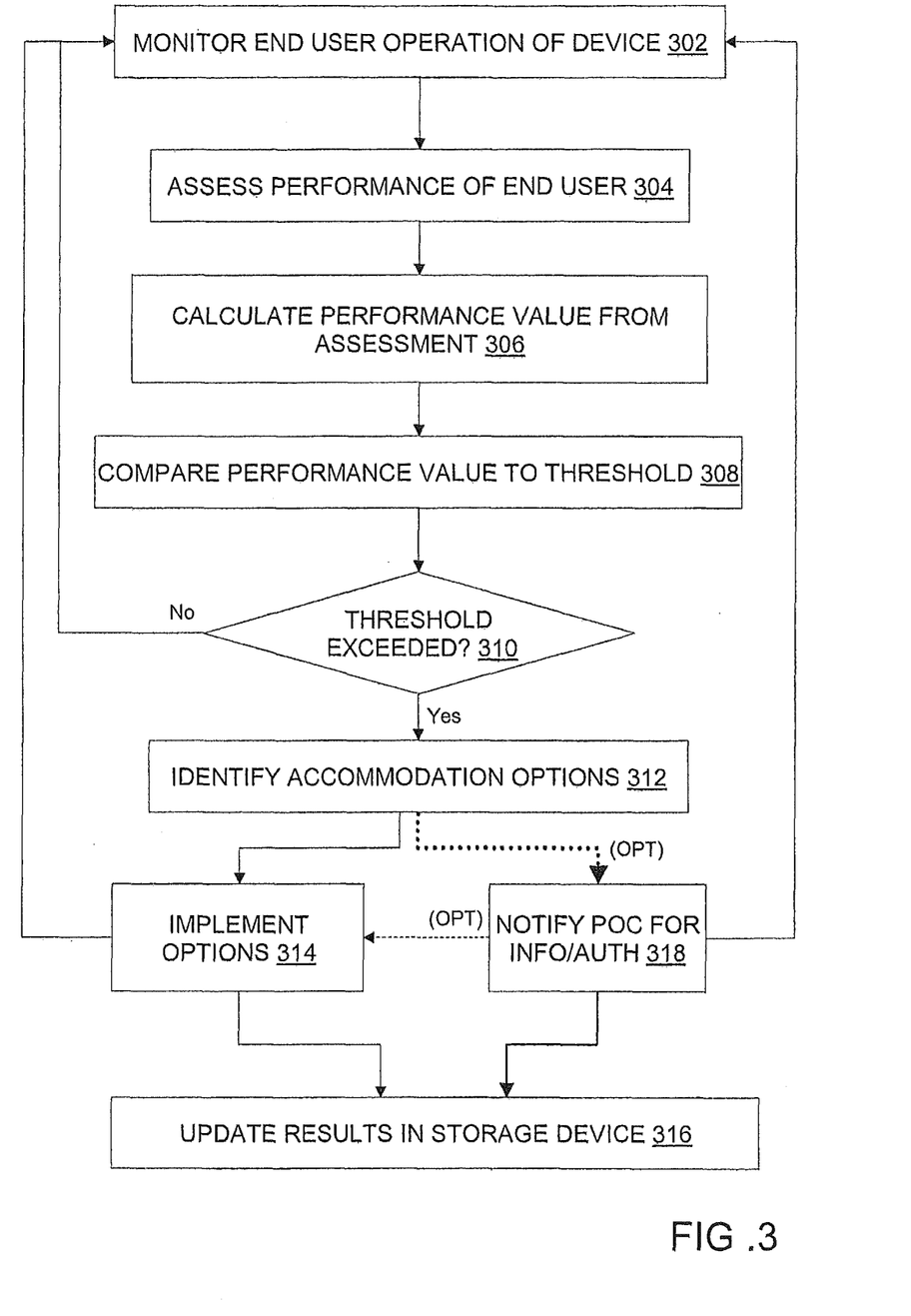
FIG. 3 illustrates a flow diagram describing a process for implementing the operational management of multi-media gaming devices in an exemplary embodiment.

Turning now to FIG. 3, an exemplary process for implementing the operational management of multi-media gaming system processes will now be described. For purposes of illustration, and by way of non-limiting example, the process described in FIG. 3 reflects a multi-player, multi-team gaming environment.

At step 302, the game management application 130 monitors the game flow (i.e., locations in the gaming application) in conjunction with end user performance for each of the end user systems participating in a gaming application. The game management application 130 gathers performance data related to tasks implemented by the end users, as well as sensor data from the measurement devices 116. Additionally, or alternatively, the game management application 130 may simply evaluate sensor data (e.g., sensitivity level of control keys accessed by players) in determining game player capabilities. Sensor/performance data may be displayed on the display device 114; a sample display screen of the display device 114 is shown in FIG. 4. In FIG. 4, a user interface screen 400 of the display device 114 includes a game window 402 and a performance window 410. The type of sensor (e.g., in columns labeled MSMT1 and MSMT2) and performance data (not shown) displayed (e.g., in performance window 410) may be determined according to end user preferences (e.g., via programmable options enabled by the DISPLAY_OPTIONS field 222 of FIG. 2).

At step 304, the gathered data (e.g., sensor and/or performance data) from step 302 is evaluated to determine each end user's physical condition (e.g., deviations in expected performance as determined by trend analyses; diminished speed or reaction time as determined by task assignments, outcomes and game flow; changes in sensor data that reflect diminished capabilities, etc.). As indicated above, the evaluation may use historical performance and sensor data in determining the physical condition.

At step 306, the game management application 130 calculates one or more performance values from assessment performed in step 304. In one exemplary embodiment, multiple performance values may be individually calculated, e.g., each corresponding to a capability associated with a task or capability as determined by a particular sensor component. The data may be combined, weighted, and normalized to achieve an overall performance value or may be used separately to determine accommodations, as described herein.

At step 308, the game management application 130 compares the performance value to defined threshold value (e.g., the value specified in THRESHOLD_ID field 220 of FIG. 2). The threshold value may be indicative of some possible impairment or deficiency of user capabilities. As indicated above, there may be multiple threshold values calculated for different types of sensor data, where accommodations identified are based on which type of sensor data (i.e., specific control key 118 shows weak pressure).

At step 310, the game management application 130 determines if threshold value has been exceeded. If not, this reflects that end user capabilities are adequate, or proficient. In this instance, the process returns to step 302.

However, if at step 310, it is determined that the threshold has been met or exceeded, the game management application 130 identifies one or more accommodation options at step 312. As indicated above, using the current position or location in the game application flow, in conjunction with the sensor data, various accommodations can be identified that are believed to positively impact overall game performance for particular players and/or teams of players. In addition, the accommodations may factor in the relative performance of each player in a team; that is, for example, two players on a team demonstrate deficiencies but one of the two players is significantly more deficient than the other. As shown in FIG. 4 for illustrative purposes, PLAYER A is reassigned new tasks based upon a determination that the player is deficient in offensive related tasks. In this example, it is assumed that offensive tasks are primarily performed by control keys 118 located on the left side of the controller 112 and that defensive tasks (e.g., rescue) are primarily performed by control keys 118 located on the right side of the controller 112. The sensor data for PLAYER A suggests that PLAYER A is impaired (e.g., injured or tired left wrist) and is reassigned to a rescue operation, which involves more right wrist action. Additionally, PLAYER B may be assigned all or a portion of PLAYER A's offensive tasks, as illustrated in the commentary 414 of performance window 410, as well as a column labeled ACCOMMODATION.

In one exemplary embodiment, at step 314, the game management application 130 automatically implements the accommodations (e.g., re-allocates task assignments, modifies tasks among team members, etc.). In another exemplary embodiment, the game management application 130 may display the accommodations on the display devices of the team members during execution of the gaming application (not shown). The accommodations displayed may be accepted or ignored by the team members. If the option to accept or ignore accommodations is provided, then in an exemplary embodiment, the game management application 130 utilizes a reward structure for incenting end users to accept task re-assignments. For example, rewards offered may include bonus points, enhanced functionality (e.g., super-power, super-speed, etc.) with respect to a particular gaming application, immunity from user-selected or game-defined tasks, or other rewards. Once the accommodations are implemented, or optionally displayed, and any rewards credited, the process returns to step 302.

At step 316, the gaming management application 130 updates the results of the performance assessments, accommodations recommended, sensor data, and rewards earned, in storage device 132. In an exemplary embodiment, these results become part of historical sensor and performance data as recorded in the data records of FIG. 2.

In an alternative exemplary embodiment in which a team leader for each team has been assigned, at step 318, the game management application 130 may notify the team leader or other point of contact of the recommended accommodations, e.g., via the display device (team leader) of information/accommodations. For example, as shown in FIG. 4, a recommendation notification 412 is displayed in the performance window 410. In one exemplary embodiment, the team leader may be given control over whether to accept or reject the accommodations and may further exercise decision making control over which of the accommodations are accepted. If the reward structure is utilized, the team leader may also be given exercise control over offering/issuing rewards to team members. The results of the performance assessments, sensor data gathering, rewards earned etc., are stored in the data records of FIG. 2 as historical performance and sensor data. The process then returns to step 302.

Technical effects and benefits include identifying accommodations to game play tasks and assignments based upon measured capabilities of game players during runtime of the gaming application. The accommodations include re-allocation of or modification to task assignments using data, such as sensor data that indicates player capabilities, as well as historical performance and sensor data collected over time. A reward structure is implemented to entice various team members to accept tasks or re-allocation assignments based upon the accommodations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
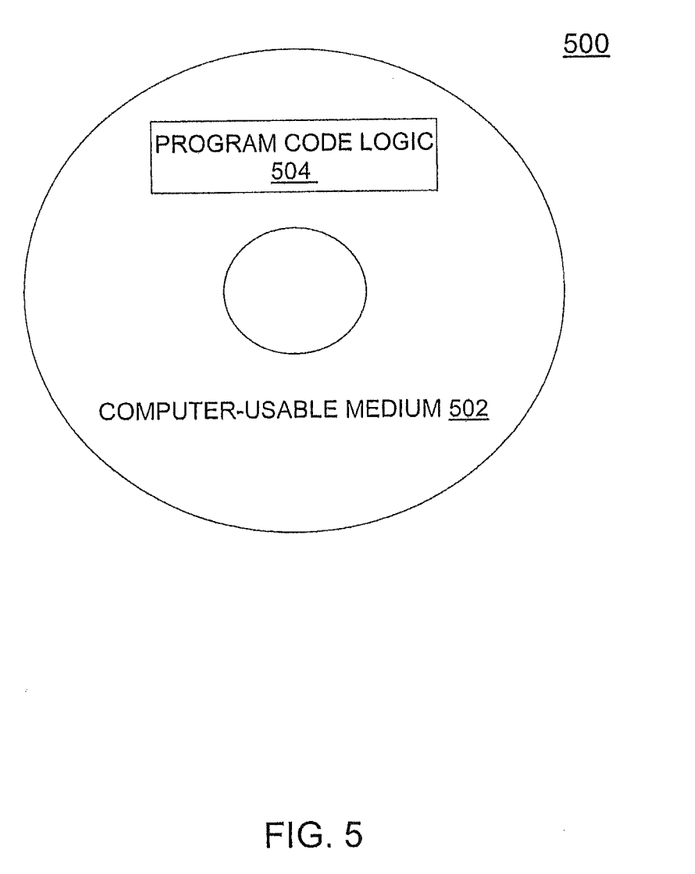
FIG. 5 illustrates a computer program product for implementing the operational management of multi-media gaming devices in an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for operational management of a multi-media system, comprising:

assessing, in the multi-media system, end user performance with respect to operation of a first multi-media device by a first end user relative to an end user performance associated with operation of a second multi-media device by a second end user, the assessing end user performance includes determining a current physical condition of the first end user, comprising:

monitoring sensor data from a biometric sensor device communicatively coupled to the first multi-media device and the first end user, the sensor data specifying biometric information of the first end user during operation of the first multi-media device;

monitoring control key pressure data comprising data indicative of a pressure being applied to a control key by the first end user of the first multi-media device;

mapping the sensor data and the control key pressure data to a function of a controller of the first multi-media device, the function performed by the first end user via the controller; and evaluating relationships between the function performed and combined sensor data and control key pressure data to derive the current physical condition; and upon determining a performance value derived from assessment of the end user performance of the first end user exceeds a pre-defined threshold value, identifying accommodation options that specify modifications to the operation of the first multi-media device and modifications to the operation of the second multi-media device in the multi-media system, the second end user of the second multi-media device engaged in a media activity concurrent with the first end user of the first multi-media device;

displaying at least one reward offered to a team member associated with the first end user via a multi-media device of the team member, the team member identified as a candidate for implementing a task for re-assignment via the accommodation options identified in response to assessing the end user performance of the first end user; and storing the at least one reward in a record of the team member who is offered the at least one reward upon acceptance of the task for re-assignment, wherein the team member is the second end user and the modifications to the second multi-media device are implemented in response to the re-assignment.

2. The method of claim 1, wherein assessing the end user performance of the first end user includes:

retrieving historical sensor data acquired via the biometric sensor device and historical performance data for the first end user; and calculating the performance value as a function of a combination of the current physical condition, the historical sensor data and the historical performance data.

3. The method of claim 1, wherein the pre-defined threshold value is a programmable value input by the first end user to the first multi-media device.

4. The method of claim 1, wherein displaying the at least one reward includes displaying the at least one reward in response to approval of the at least one reward by a team leader charged with having decision control over team members, the team members including the team member identified as the candidate for implementing the task for re-assignment.

5. The method of claim 1, wherein the at least one reward comprises at least one of:
bonus points; and
enhanced functions during execution of a gaming application.

6. The method of claim 1, wherein the biometric information of the first end user includes at least one of:
pulse rate;
blood pressure;
body temperature;
pH level; and
motion.

7. The method of claim 1, wherein the pre-defined threshold value is a static value defined by the multi-media system.

8. The method of claim 1, wherein the at least one reward comprises immunity from tasks.

9. An apparatus for operational management of a multi-media system, comprising:
a computer processor; and
logic executing on the computer processor, the logic implementing a method, comprising:
assessing, in the multi-media system, end user performance with respect to operation of a first multi-media device by a first end user relative to an end user performance associated with operation of a second multi-media device by a second end user, the assessing end user performance includes determining a current physical condition of the first end user, comprising:
monitoring sensor data from a biometric sensor device communicatively coupled to the first multi-media device and the first end user, the sensor data specifying biometric information of the first end user during operation of the first multi-media device;
monitoring control key pressure data comprising data indicative of a pressure being applied to a control key by the first end user of the first multi-media device;
mapping the sensor data and the control key pressure data to a function of a controller of the first multi-media device, the function performed by the first end user via the controller; and
evaluating relationships between the function performed and combined sensor data and control key pressure data to derive the current physical condition; and
upon determining a performance value derived from assessment of the end user performance of the first multi-media device exceeds a pre-defined threshold value, identifying accommodation options that specify modifications to the operation of the first multi-media device and modifications to the operation of the second multi-media device in the multi-media system, the second end user of the second multi-media device engaged in a media activity concurrent with the first end user of the first multi-media device;

displaying at least one reward offered to a team member associated with the first end user via a multi-media device of the team member, the team member identified as a candidate for implementing a task for re-assignment via the accommodation options identified in response to assessing the end user performance of the first end user; and storing the at least one reward in a record of the team member who is offered the at least one reward upon acceptance of the task for re-assignment, wherein the team member is the second end user and the modifications to the second multi-media device are implemented in response to the re-assignment.

10. The apparatus of claim 9, wherein assessing the end user performance of the first end user includes:
retrieving historical sensor data acquired from the biometric sensor device and historical performance data for the first end user; and
calculating the performance value as a function of a combination of the current physical condition, the historical sensor data and the historical performance data.

11. The apparatus of claim 9, wherein the pre-defined threshold value is at least one of:
a programmable value input by the first end user to the first multi-media device; and
a static value defined by the multi-media system.

12. The apparatus of claim 9, wherein displaying the at least one reward includes displaying the at least one reward in response to approval of the at least one reward by a team leader charged with having decision control over team members, the team members including the team member identified as the candidate for implementing the task for re-assignment.

13. The apparatus of claim 9, wherein the at least one reward comprises at least one of:
bonus points;
immunity from tasks; and
enhanced functions during execution of a gaming application.

14. The apparatus of claim 9, wherein the biometric information includes at least one of:
pulse rate;
blood pressure;
body temperature;
pH level; and
motion.

15. A computer program product for operational management of a multi-media system, the computer program product comprising a non-transitory storage medium encoded with machine-readable computer program code, which when executed by a computer, cause the computer to implement a method, the method comprising:
assessing, in the multi-media system, end user performance with respect to operation of a first multi-media device by a first end user relative to an end user performance associated with operation of a second multi-media device by a second end user, the assessing end user performance includes determining a current physical condition of the first end user, comprising:
monitoring sensor data from a biometric sensor device communicatively coupled to the first multi-media device and the first end user, the sensor data specifying biometric information of the first end user during operation of the first multi-media device;

monitoring control key pressure data comprising data indicative of a pressure being applied to a control key by the first end user of the first multi-media device;

mapping the sensor data and the control key pressure data to a function of a controller of the first multi-media device, the function performed by the first end user via the controller; and evaluating relationships between the function performed and combined sensor data and control key pressure data to derive the current physical condition; and upon determining a performance value derived from assessment of the end user performance of the first multi-media device exceeds a pre-defined threshold value, identifying accommodation options that specify modifications to the operation of the first multi-media device and modifications to the operation of the other multi-media device in the multi-media system, the second end user of the second multi-media device is engaged in a media activity concurrent with the first end user of the multi-media device;

displaying at least one reward offered to a team member associated with the first end user via a multi-media device of the team member, the team member identified as a candidate for implementing a task for re-assignment via the accommodation options identified in response to assessing the end user performance of the first end user; and storing the at least one reward in a record of the team member who is offered the at least one reward upon acceptance of the task for re-assignment, wherein the team member is the second end user and the modifications to the second multi-media device is implemented in response to the re-assignment.

16. The computer program product of claim 15, wherein assessing the end user performance of the first end user includes:
retrieving historical sensor data acquired from the biometric sensor device and historical performance data for the first end user; and
calculating the performance value as a function of a combination of the current physical condition, the historical sensor data and the historical performance data.

17. The computer program product of claim 15, wherein the pre-defined threshold value is at least one of:
a programmable value input by the first end user to the first multi-media device; and
a static value defined by the multi-media system.

18. The computer program product of claim 15, wherein displaying the at least one reward includes displaying the at least one reward in response to approval of the at least one reward by a team leader charged with having decision control over team members, the team members including the team member identified as the candidate for implementing the task for re-assignment.

19. The computer program product of claim 15, wherein the at least one reward comprises at least one of:
bonus points;
immunity from tasks; and
enhanced functions during execution of a gaming application.

20. The computer program product of claim 15, wherein the biometric information includes at least one of:
pulse rate;
blood pressure;
body temperature;
pH level; and
motion.

* * * * *